United States Patent Office 2,887,477
Patented May 19, 1959

2,887,477

2-HYDROXY-5-METHYLSULFONYLPHENYLAZO-DIPHENYLAMINE COMPOUNDS

James M. Straley and John G. Fisher, Kingsport, Tenn., assignors to Eastman Kodak Company, Rochester, N.Y., a corporation of New Jersey No Drawing. Application September 7, 1955
Serial No. 533,001

9 Claims. (Cl. 260—149)

This invention relates to certain metallized and non-metallized 2-hydroxy-5-methylsulfonylphenylazodiphenylamine compounds and their application to the art of dyeing or coloring.

The non-metallized azo compounds of our invention have the formula:

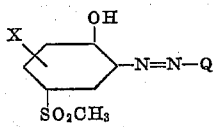

wherein X represents a hydrogen atom, a nitro group or a chlorine atom and Q represents a diphenylamine radical, free of a sulfonic acid group, joined through the carbon atom in its 4-position to the azo bond shown and which contains a hydroxy group, a methoxy group, an ethoxy group, a propoxy group, a butoxy group or a β-hydroxyethoxy group joined to the carbon atom in its 3-position. When these azo compounds are treated with salts of nickel, cobalt, copper, chromium, manganese, iron or vanadium, complexes of the azo compounds with these metals are formed. The complex monoazo compounds formed constitute the metallized monoazo compounds of our invention.

While our invention relates broadly to the metallized and the non-metallized monazo compounds just described, it relates more particularly to the metallized and the non-metallized forms of the azo compounds having the formula:

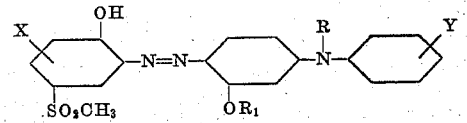

wherein R represents a hydrogen atom, a methyl group, a β-hydroxyethyl group or a β-cyanoethyl group, $R_1$ represents a hydrogen atom, a methyl group, an ethyl group or a β-hydroxyethyl group, X represents a hydrogen atom, a nitro group or a chlorine atom and Y represents a hydrogen atom, a methyl group, a methoxy group or a chlorine atom.

The non-metallized monoazo compounds of our invention are useful for the dyeing of cellulose alkyl carboxylic acid esters having 2 to 4 carbon atoms in the acid groups thereof, nylon, sulfone polyesters, polyethylene terephthalate and polyacrylonitrile, especially acrylonitrile graft polymers. After application to these materials, usually in the form of textile materials, the dye may be metallized thereon, if desired. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, ethylene glycol monomethyl ether and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the non-metallized dye compounds of the invention and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

The non-metallized monoazo compounds of our invention are prepared by diazotizing a 2-amino-4-methylsulfonylphenol compound having the formula:

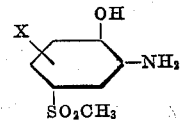

wherein X has the meaning previously assigned to it and coupling the diazonium compound obtained with a diphenylamine compound which contains a hydroxy group, a methoxy group, an ethoxy group, a propoxy group, a butoxy group or a β-hydroxyethoxy group joined to the carbon atom in its 3-position. While these compounds can color the materials indicated hereinbefore, they are particularly of use because they possess the important property of being metallizable and can be used to prepare the valuable metallized azo compounds of the invention.

The metallized monoazo compounds of our invention are prepared by metallizing the non-metallized azo compounds of our invention either on or off the materials they color. Metallization can be carried out, for example, by treating the non-metallized dye with a solution or dispersion of the metallizing agent. Although the metal complex is often formed at room temperature, we prefer to accelerate the process by heating, usually with steam for a short time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [Ni(SCN)$_2$], cobaltous bromide, cobaltic chloride, cobaltous chloride, cobaltous acetate, cobaltous cyanide, cobalt thiocyanate [Co(SCN)$_2$], cupric chloride, cupric bromide, cupric acetate, cupric lactate, chromium trichloride, chromium tribromide, chromic sulfate, chromic acetate, chromium thiocyanate

[Cr(SCN)$_3$]

manganese chloride, manganous sulfate, manganese acetate, manganese thiocyanate [Mn(SCN)$_2$], ferric chloride, ferric fluoride, ferrous acetate, ferrous thiocyanate [Fe(SCN)$_2$], ferric thiocyanate [Fe(SCN)$_3$] and vanadium thiocyanate, are illustrative of the metallizing agents that can be employed.

When the metal complex is formed on a cellulose alkyl carboxylic acid ester, such as cellulose acetate, fiber the use of a metal thiocyanate appears to be advantageous and is preferred. Nickel thiocyanate appears to be especially useful and particular claim is laid to its use. Next to nickel thiocyanate the use of cobalt thiocyanate is preferred.

2-amino-4-methylsulfonylphenol, 2-amino-4,6-bismethylsulfonylphenol, 2-amino-4-methylsulfonyl-6-chlorophenol, 2-amino-4-methylsulfonyl-5-nitrophenol and 2-amino-4-methylsulfonyl-6-nitrophenol are illustrative of the 2-amino-4-methylsulfonylphenol compounds used in the preparation of the azo compounds of our invention.

3-hydroxydiphenylamine, 3-hydroxy-4'-methoxydiphenylamine, 3-hydroxy-4'-ethoxydiphenylamine, 3-hydroxy-4'-n-propoxydiphenylamine, 3-hydroxy-4'-isopropoxydiphenylamine, 3-hydroxy-4'-n-butoxydiphenylamine, 3-hydroxy-4'-methyldiphenylamine, 3-hydroxy-3'-methyldiphenylamine, 3-hydroxy-4'-ethyldiphenylamine, 3-hydroxy-4'-n-butyldiphenylamine, 3-hydroxy-2'-chlorodiphenylamine, 3-hydroxy-3'-chlorodiphenylamine, N-methyl-3-methoxydiphenylamine, N-ethyl-3-methoxydiphenylamine, N-n-propyl-3-methoxydiphenylamine, N-n-butyl-3-methoxydiphenylamine, 3-methoxydiphenylamine, 3-ethoxydiphenylamine, 3-n-propoxydiphenylamine, 3-n-butoxydiphenylamine, 3-isopropoxydiphenylamine, 3-$\beta$-hydroxyethoxyamine, N-$\beta$-hydroxyethyldiphenylamine, 3-$\beta$-hydroxyethoxy-N-$\beta$-hydroxyethyl-4'-methoxydiphenylamine, 3-$\beta$-hydroxyethoxy-N-$\beta$-hydroxyethyl-2'-chlorodiphenylamine, 3-methoxy-N-$\gamma$-hydroxypropyldiphenylamine, 3-hydroxy-N-$\beta$-hydroxyethyldiphenylamine, 3-hydroxy-N-$\gamma$-hydroxypropyldiphenylamine, 3-methoxy-N-$\beta$-hydroxyethyldiphenylamine, 3-hydroxy-2-methoxydiphenylamine, 3-hydroxy-2'-methyldiphenylamine, 3-hydroxy-2'-methoxy-N-$\beta$-hydroxyethyldiphenylamine, 3-methoxy-N-$\delta$-hydroxybutyldiphenylamine, 3-hydroxy-N-$\beta$-hydroxyethyl-2'-chlorodiphenylamine, 3-hydroxy-N-$\beta$-cyanoethyldiphenylamine, 3-methoxy-N-$\beta$-cyanoethyldiphenylamine, 3-hydroxy-2'-methoxy-N-$\beta$-hydroxyethyldiphenylamine, 3-hydroxy-2'-chloro-N-$\beta$-hydroxyethyldiphenylamine, 3-n-butoxy-N-$\beta$-hydroxyethyldiphenylamine, 3-hydroxy-N-$\gamma$-cyanopropyldiphenylamine and 3-methoxy-N-$\gamma$-cyanopropyldiphenylamine, for example, are illustrative of the diphenylamine compounds used in the preparation of the azo compounds of our invention.

Both the metallized and non-metallized monoazo compounds of our invention are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer (a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed are thus polymers having directed placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a CH$_2$=C< group, or an interpolymer of two or more of such monomers; and the grafting can be effected with the preformed homopolymer or interpolymer in the polymerization mixture in which it was formed (i.e. a live polymer) or with the preformed polymer isolated from the polymerization mixture in which it was formed (i.e. a dead polymer).

The preferred polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

Insofar as acrylonitrile graft polymers are concerned, the new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U.S. Patent 2,620,324, issued December 2, 1952, U.S. Patent 2,649,434, issued August 18, 1953, and U.S. Patent 2,657,191, issued October 27, 1953, disclose other typical graft polymers that can be dyed with the new azo compounds of our invention.

Sulfone polyester textile materials that can be colored with the new azo compounds of our invention are disclosed in U.S. Patent 2,614,120, issued October 14, 1952. Additional sulfone polyester textile materials that can be colored with our new azo compounds are disclosed and claimed in copending Caldwell U.S. application Serial No. 313,061, filed October 3, 1952, now Patent No. 2,744,889.

Metallization will be described more particularly with reference to nickel and cobalt inasmuch as the metallized dyes containing these metals in complex combination appear to be advantageous. However, it will be clearly understood that the non-metallized azo compounds can be metallized with the other metals disclosed herein in accordance with the metallization procedure disclosed herein. The azo compounds of our invention have varying utility as dyes. The degree of utility varies, for example, depending upon the material being colored and the formula of the azo compound.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The following examples illustrate the compounds of our invention and their manner of preparation.

Example 1

3.8 grams of sodium nitrite were dissolved in 25 cc. of concentrated $H_2SO_4$ at 70° C. and the resulting nitrosyl sulfuric acid solution was cooled to 0° C. 9.3 grams of 2-amino-4-methylsulfonylphenol in 50 cc. of a mixture containing one part by volume of n-propionic acid to five parts by volume of acetic acid (this n-propionic-acetic acid mixture is hereinafter referred to as 1-5 acid) were added with good stirring to the nitrosyl sulfuric acid solution. Another 50 cc. portion of 1-5 acid was added to the reaction mixture and the resulting mixture was stirred for two hours at 0° C.–5° C. The diazonium solution thus obtained was added at a temperature below 10° C. to a solution of 13.7 grams of 3-β-hydroxyethoxy-N-β-hydroxyethyldiphenylamine in 150 cc. of 1-5 acid. The coupling reaction which takes place was completed by neutralizing the mineral acid present with ammonium acetate and stirring the reaction mixture for 1.5 hours at room temperature. Following this, the reaction mixture was drowned in 2000 cc. of water and the dye compound which precipitated was recovered by filtration, washed with water until neutral and dried in a vacuum at 50° C. 21.5 parts of the monoazo compound 3-β-hydroxyethoxy-4-(2-hydroxy-5-methylsulfonylphenylazo)-N-β-hydroxyethyldiphenylamine, having the formula:

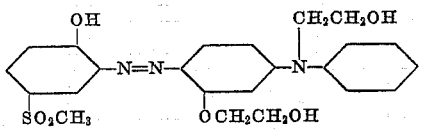

were obtained. It colors cellulose acetate, nylon, wool, acrylonitrile graft polymers and silk, for example, golden yellow shades.

Example 2

9.3 grams of 2-amino-4-methylsulfonylphenol were diazotized and the diazonium compound obtained was coupled with a solution of 12.2 grams of 3-methoxy-N-β-hydroxyethyldiphenylamine in 150 cc. of 1-5 acid. Diazotization, coupling and recovery of the dye compound formed were carried out in accordance with the general procedure described in Example 1. 19.1 grams of 3-methoxy-4-(2-hydroxy-5-methylsulfonylphenylazo)-N-β-hydroxyethyldiphenylamine which colors cellulose acetate, nylon, acrylonitrile graft polymers and polyethylene terephthalate, for example, orange shades were obtained.

Example 3

9.3 grams of 2-amino-4-methylsulphonylphenol were diazotized and the diazonium compound obtained was coupled with 9.2 grams of 3-hydroxydiphenylamine. Diazotization, coupling and recovery of the dye compound formed were carried out in accordance with the procedure described in Example 1. 17.5 grams of a dye compound which colors cellulose acetate orange shades and which colors acrylonitrile graft polymers were thus obtained. The dyeing obtained on these materials have good fastness to light.

By the use of 11 grams of 3-hydroxy-2'-chlorodiphenylamine, 10.2 grams of 3-hydroxy-4'-methoxydiphenylamine, 10 grams of 3-hydroxy-2'-methyldiphenylamine, 10 grams of 3-hydroxy-4'-methyldiphenylamine, 10 grams of 3-methoxydiphenylamine, 10.8 grams of 3-methoxy-3'-methyldiphenylamine and 15.5 grams of 3-β-hydroxyethoxy-N-β-hydroxyethyl-3'-chlorodiphenylamine, respectively, in place of 3-hydroxydiphenylamine in the preceding paragraph, 18.1 grams of 2'-chloro-3-hydroxy-, 16.3 grams of 4'-methoxy-3-hydroxy-, 15.2 grams of 2'-methyl-3-hydroxy-, 16.1 grams of 4'-methyl-3-hydroxy-, 17.8 grams of 3-methoxy-, 18.3 grams of 3'-methyl-3-methoxy-, 4-(2-hydroxy-5-methylsulfonylphenylazo)diphenylamine, and 22 grams of 3'-chloro-3-β-hydroxyethoxy-4-(2-hydroxy-5-methylsulfonylphenylazo)-N-β-hydroxyethyldiphenylamine, respectively, were obtained. Each of these dye compounds colors cellulose acetate orange shades and also colors acrylonitrile graft polymers.

Example 4

9.3 grams of 2-amino-4-methylsulfonylphenol were diazotized and the diazonium compound obtained was coupled with 11 grams of 3-hydroxy-3'-chlorodiphenylamine in 150 cc. of 1-5 acid. Diazotization, coupling and recovery of the dye compound formed were carried out in accordance with the procedure described in Example 1. 18.2 grams of a dye compound which colors cellulose acetate and nitrogenous fibers orange shades were obtained.

Example 5

A cellulose acetate fabric dyed with a 3% dyeing of the dye product of Example 4 was padded with a 3% aqueous solution of cobalt thiocyanate under conditions such that a 60–100% pick-up, based on the weight of the fabric, was obtained. The cellulose acetate fabric was then steamed for 10 minutes at 212° F., soaped for 10 minutes at 160° F., rinsed well with water and dried. The beautiful red-brown dyeing obtained withstood a standard AATCC wash test at 160° F. Further, while the unmetallized dyeing showed noticeable fading after five hours exposure on a fadeometer, the metallized dyeing showed no break after 20 hours exposure on a fadeometer.

Example 6

By the use of a 3% aqueous solution of nickel thiocyanate in place of cobalt thiocyanate in Example 5, a red dyeing having excellent resistance to light and laundering was obtained.

Example 7

A solution of 19 grams of the product of Example 4, 20 grams of cupric acetate crystals and 15 grams of sodium carbonate in 1000 cc. of ethylene glycol monomethyl ether was refluxed for 16 hours. The reaction mixture thus obtained was cooled and then drowned in 20 liters of water and the mixture thus obtained was brought to boiling with direct steam and filtered while hot. The metallized dye product which collected on the filter was washed with hot water until neutral and then dried at 110° C. 24 grams of the copper complex of the dye compound of Example 4 were obtained in the form of a red powder. When this pigment material was intimately dispersed in finely divided condition in a cellulose acetate-acetone dope solution in a concentration of 2% based on the weight of the cellulose acetate and the cellulose acetate dope solution was extruded in the usual manner, a bright red yarn having excellent resistance to light and washing was obtained.

Example 8

1 gram of the reaction product described in the first paragraph of Example 3 was refluxed in 16 cc. of acetone. 2.2 cc. of 28% ammonium hydroxide were added followed by 1 gram of nickel acetate crystals in 20 cc. of acetone. The reaction mixture thus obtained was stirred and refluxed for 2.5–3 hours and then drowned in 400 cc. of water. The nickel complex of the monoazo compound of Example 3 which precipitated was recovered by filtration, washed well with water, and dried at 60° C. The yield was 1.1 grams. The dye product obtained as just described, when intimately dispersed in finely divided condition in a cellulose acetate-acetone dope solution and extruded in the usual manner, gives a deep red colored yarn which has excellent resistance to the action of light and good resistance to laundering.

By the use of 1 gram of cobaltous acetate crystals in place of the nickel acetate crystals used in the preceding paragraph, a metallized dye compound is obtained which colors cellulose acetate yarn an almost identical shade which has somewhat better wash fastness than the dye obtained with the corresponding nickel complex dye. The light fastness of the colored yarn is excellent.

Example 9

1 gram of 3-methoxy-4-(2-hydroxy-5-methylsulfonylphenylazo)diphenylamine, 1 gram of nickel chloride crystals, 1 gram of ammonium acetate and 50 cc. of the monomethyl ether of ethylene glycol were refluxed together with stirring for 3 hours. The reaction mixture thus obtained was drowned in 500 cc. of water and the nickel complex of the azo compound just named was recovered by filtration, washed well with water and dried. When incorporated into a cellulose acetate-acetone dope solution and extruded in the usual manner, a cellulose acetate yarn having brownish-red shades of excellent resistance to light and laundering was obtained.

By the use of 1 gram of cobalt chloride in place of nickel chloride in the preceding paragraph, the metallized dye obtained colors cellulose acetate yarn somewhat acetate-acetone dope solution and spun into yarn produced red shades having excellent light fastness and good wash fastness.

The example in the preceding paragraph was repeated using 100 cc. of a 16% aqueous solution of cobalt thiocyanate in place of the nickel thiocyanate solution. The cellulose acetate yarn produced had excellent light fastness and had a slightly duller red shade and somewhat better wash fastness than the cellulose acetate yarn of the preceding paragraph.

Any of the diazo components disclosed herein can be coupled with any of the coupling components disclosed herein to obtain dye compounds of our invention. The following tabulation further illustrates the non-metallized and the metallized azo compounds of our invention and sets forth the colors they color cellulose acetate. "Original" refers to the color of the non-metallized dye on cellulose acetate while "final" refers to the color of the metallized dye on cellulose acetate.

| Diazo Component | Coupling Component | Metallizing Agent | Color on Cellulose Acetate | |
|---|---|---|---|---|
| | | | Original | Final |
| 2-Amino-4-methylsulfonylphenol | 3-Hydroxy-4'-methoxydiphenylamine | Ni(SCN)$_2$ | orange | red. |
| Do | do | Co(SCN)$_2$ | do | Do. |
| Do | 3-Hydroxy-2'-methyldiphenylamine | Ni(SCN)$_2$ | do | Do. |
| Do | do | Co(SCN)$_2$ | do | Do. |
| Do | 3-Hydroxy-3'-methyldiphenylamine | Ni(SCN)$_2$ | do | Do. |
| Do | do | Co(SCN)$_2$ | do | red-brown. |
| Do | 3-Hydroxy-2'-chlorodiphenylamine | Ni(SCN)$_2$ | do | red. |
| Do | do | Co(SCN)$_2$ | do | Do. |
| Do | 3-Hydroxy-3'-chlorodiphenylamine | Ni(SCN)$_2$ | do | Do. |
| Do | do | Co(SCN)$_2$ | do | Do. |
| Do | 3-Hydroxy-N-β-cyanoethyldiphenylamine | Ni(SCN)$_2$ | do | violet. |
| Do | do | Co(SCN)$_2$ | do | brown. |
| Do | 3-Methoxy-3'-methoxydiphenylamine | Ni(SCN)$_2$ | do | red. |
| Do | do | Co(SCN)$_2$ | do | red-brown. |
| Do | 3-Methoxy-2'-methyldiphenylamine | Ni(SCN)$_2$ | do | red. |
| Do | do | Co(SCN)$_2$ | do | red-brown. |
| Do | 3-Hydroxy-N-β-hydroxyethyldiphenylamine | Ni(SCN)$_2$ | gold | Do. |
| Do | do | Co(SCN)$_2$ | do | yellow-brown. |
| Do | 3-Hydroxyethoxy-N-β-hydroxyethyldiphenylamine | Ni(SCN)$_2$ | yellow | red. |
| Do | do | Co(SCN)$_2$ | do | brown. |
| Do | 3-Hydroxy-4'-methoxy-N-β-hydroxyethyldiphenylamine | Ni(SCN)$_2$ | orange | red. |
| Do | do | Co(SCN)$_2$ | do | red-brown. |
| Do | 3-Hydroxy-2'-methoxy-N-β-hydroxyethyldiphenylamine | Ni(SCN)$_2$ | do | red. |
| Do | do | Co(SCN)$_2$ | do | red-brown. |
| Do | 3'-Methoxy-3-β-hydroxyethyoxy-N-β-hydroxyethyldiphenylamine | Ni(SCN)$_2$ | do | red. |
| Do | do | Co(SCN)$_2$ | do | red-brown. |
| Do | 3'-Methyl-3-β-hydroxyethoxy-N-β-hydroxyethyldiphenylamine | Ni(SCN)$_2$ | do | red. |
| Do | do | Co(SCN)$_2$ | do | red-brown. |
| Do | 3'-Chloro-3-β-hydroxyethoxy-N-β-hydroxethyldiphenylamine | Ni(SCN)$_2$ | do | Do. |
| Do | do | Co(SCN)$_2$ | do | Do. |
| 2-Amino-4-methylsulfonyl-5-nitrophenol | 3-Hydroxydiphenylamine | Ni(SCN)$_2$ | red | violet. |
| Do | do | Co(SCN)$_2$ | do | Do. |
| Do | 3-Methoxy-N-β-hydroxyethyldiphenylamine | Ni(SCN)$_2$ | do | Do. |
| Do | do | Co(SCN)$_2$ | do | Do. |
| 2-Amino-4,6-bismethylsulfonylphenol | 3-Hydroxydiphenylamine | Ni(SCN)$_2$ | brown | brown. |
| Do | do | Co(SCN)$_2$ | do | Do. |
| 2-Amino-4,6-bismethylsulfonylphenol | 3-Methoxydiphenylamine | Ni(SCN)$_2$ | do | red. |
| Do | do | Co(SCN)$_2$ | do | red-brown. | browner shades having excellent resistance to light and laundering.

Example 10

The preparation of 4'-methyl-3-hydroxy-4-(2-hydroxy-5-methylsulfonylphenylazo)diphenylamine (see Example 3), was repeated except, that instead of drying, the moist cake was suspended in 300 cc. of water and 100 cc. of a 17% aqueous solution of nickel thiocyanate was added. The reaction mixture thus obtained was stirred and heated at 80° C.–90° C. while keeping the reaction mixture alkaline by the addition of 10% aqueous sodium carbonate. When no more acid was generated, the slightly alkaline reaction mixture was cooled and the nickel complex of the azo dye named above was recovered by filtration, washed well with water and dried. The dye compound thus obtained when incorporated into a cellulose The non-metallized monoazo dye compounds of our invention can be applied to cellulose alkyl carboxylic acid esters having 2 to 4 carbon atoms in the acid groups thereof, nylon, sulfone polyester, polyacrylonitrile, especially acrylonitrile graft polymers, and polyethylene terephthalate, textile materials and the metallized azo dye compounds of our invention can be applied to nitrogenous textile materials such as, for example, wool, silk, nylon and acrylonitrile polymers, in the form of an aqueous dispersion and are ordinarily so applied.

To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried. In the case of certain of the acrylonitrile graft polymers described hereinbefore it is necessary to dye at the boil for an extended period of time.

Instances may be encountered where the fiber is not satisfactorily colored by the dyeing procedure just described. In these instances special dyeing techniques, such as the use of pressure, for example, developed by the art for the coloration of materials difficult to color may be employed.

As previously indicated the nonmetallized azo compounds can be metallized on the materials they color. Thus, the metallized dyes can be used to color any materials the nonmetallized azo compounds color by metallizing the nonmetallized azo compounds on the materials to which they have been applied.

Widely varying amounts of dye can be used in the dyeing operation. The amount of dye used can be, for example, ⅛ to 3% (by weight) of that of the textile material although lesser or greater amounts of the dye can be employed.

The following example illustrates one satisfactory way in which the fibers of the acrylonitrile graft polymers can ordinarily be dyed using either the nonmetallized or metallized azo compounds of our invention. 16 milligrams of dye are ground with an aqueous solution of sodium lignin sulfonate until well dispersed or alternately the dye can be dissolved in 5 cc. of hot ethylene glycol monoethyl ether. The dispersion or solution, as the case may be, is then poured into 150 cc. of water to which a small amount of a surface-active agent such as Igepon T ($C_{17}H_{33}.CO.N(CH_3).C_2H_4SO_3Na$) Nekal BX (sodium alkylnaphthalenesulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

Acrylonitrile graft polymers including those of the type specifically described hereinbefore are described and claimed in Coover U.S. application Serial No. 408,012, filed February 3, 1954, now Patent No. 2,838,470.

The diphenylamine coupling components used in the preparation of the azo compounds described herein are, for the most part, old compounds. The preparation of many of the coupling components is described or indicated, for example, in U.S. Patent 2,077,322. Their manner of preparation is further illustrated by the following examples.

*Example A*

40 grams of 3-methoxydiphenylamine, 18 cc. of glacial acetic acid, 18 cc. of acrylonitrile, 2 grams of cupric acetate and 4 grams of copper bronze were heated together in an autoclave at 150° C. for 8 hours. The reaction mixture thus obtained was distilled under reduced pressure. The fraction boiling at 176° C.–185° C./1.5 mm. was collected and consisted essentially of N-β-cyanoethyl-3-methoxydiphenylamine.

*Example B*

62 grams of 3-hydroxydiphenylamine, 38 grams of ethylene oxide and 125 grams of ethyl alcohol were heated together at 200° C. for 12 hours in an autoclave with agitation. Upon cooling, the contents of the autoclave were fractionally distilled. After removal of the ethyl alcohol, the following cuts were taken:

1. B.P. 188° C.–194° C./0.5 mm.—27 grams
2. B.P. 214° C.–217° C./0.3 mm.—37 grams On standing cut No 2 solidified and upon recrystallization from benzene, melted at 74° C.–75° C. Cut No. 2 was found to be 3-β-hydroxyethoxy-N-β-hydroxyethyldiphenylamine while cut No. 1 was found to be 3-hydroxy-N-β-hydroxyethyldiphenylamine.

We claim:

1. A complex metal compound which contains one of the metals selected from the group consisting of chromium, cobalt, copper, iron, manganese, nickel and vanadium in complex combination with a monoazo compound having the formula:

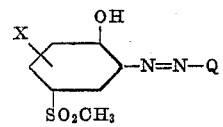

wherein X represents a member selected from the group consisting of a hydrogen atom, a nitro group and a chlorine atom and Q represents a diphenylamine radical, free of a sulfonic acid group, joined through the carbon atom in its 4-position to the azo bond shown and which contains a member selected from the group consisting of a hydroxy group, a methoxy group, an ethoxy group, a propoxy group, a butoxy group and a β-hydroxyethoxy group joined to the carbon atom in its 3-position.

2. A complex metal compound which contains one of the metals selected from the group consisting of chromium, cobalt, copper, iron, manganese, nickel and vanadium in complex combination with a monoazo compound having the formula:

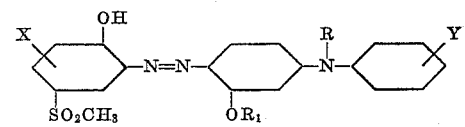

wherein R represents a member selected from the group consisting of a hydrogen atom, a methyl group, a β-hydroxyethyl group and a β-cyanoethyl group, $R_1$ represents a member selected from the group consisting of a hydrogen atom, a methyl group, an ethyl group and a β-hydroxyethyl group, X represents a member selected from the group consisting of a hydrogen atom, a nitro group and a chlorine atom and Y represents a member selected form the group consisting of a hydrogen atom, a methyl group, a methoxy group and a chlorine atom.

3. Complex nickel compounds of the monoazo compounds having the formula set forth in claim 2.

4. Complex cobalt compounds of the monoazo compounds having the formula set forth in claim 2.

5. The nickel complex of the monoazo compound having the formula:

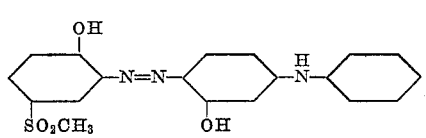

6. The nickel complex of the monoazo compound having the formula:

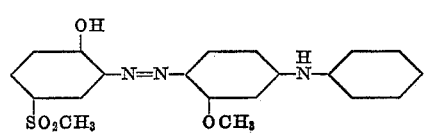

7. The nickel complex of the monoazo compound having the formula:
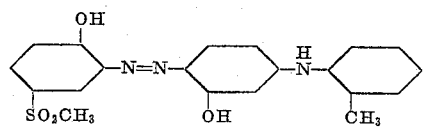
8. The nickel complex of the monoazo compound having the formula:
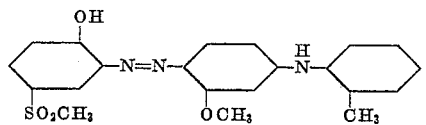
9. The nickel complex of the monoazo compound having the formula:
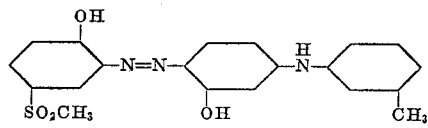
References Cited in the file of this patent
UNITED STATES PATENTS
| | | |
|---|---|---|
| 2,077,322 | Hatt | Apr. 13, 1937 |
| 2,529,444 | Bestehorn et al. | Nov. 7, 1950 |
| 2,551,056 | Schetty | May 1, 1951 |